United States Patent
Hazzani et al.

(10) Patent No.: US 9,363,667 B2
(45) Date of Patent: Jun. 7, 2016

(54) SYSTEM AND METHOD FOR USER-PRIVACY-AWARE COMMUNICATION MONITORING AND ANALYSIS

(71) Applicant: Verint Systems Ltd., Herzelia, Pituach (IL)

(72) Inventors: Gideon Hazzani, Rishon Le Zion (IL); Yoav Ariav, Kfar saba (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 80 days.

(21) Appl. No.: 14/058,467

(22) Filed: Oct. 21, 2013

(65) Prior Publication Data

US 2014/0177841 A1      Jun. 26, 2014

(30) Foreign Application Priority Data

Oct. 21, 2012    (IL) .......................................... 222574

(51) Int. Cl.
| | | |
|---|---|---|
| H04L 9/00 | (2006.01) | |
| H04W 12/04 | (2009.01) | |
| H04L 29/06 | (2006.01) | |
| H04W 12/02 | (2009.01) | |
| H04W 4/02 | (2009.01) | |

(52) U.S. Cl.
CPC ........... *H04W 12/04* (2013.01); *H04L 63/0428* (2013.01); *H04L 63/308* (2013.01); *H04W 12/02* (2013.01); *H04W 4/025* (2013.01)

(58) Field of Classification Search
CPC .................................................. H04W 12/04
See application file for complete search history.

(56) References Cited

U.S. PATENT DOCUMENTS

| | | |
|---|---|---|
| 5,689,442 A | 11/1997 | Swanson et al. |
| 6,404,857 B1 | 6/2002 | Blair et al. |
| 6,718,023 B1 | 4/2004 | Zolotov |
| 6,757,361 B2 | 6/2004 | Blair et al. |
| 7,216,162 B2 | 5/2007 | Amit et al. |
| 7,466,816 B2 | 12/2008 | Blair |
| RE40,634 E | 2/2009 | Blair et al. |

(Continued)

FOREIGN PATENT DOCUMENTS

EP      2437477 A1  *  4/2012

OTHER PUBLICATIONS

European Search Report and Preliminary Opinion, dated Jan. 9, 2014, received in connection with corresponding European Application No. 13189531.

(Continued)

*Primary Examiner* — Brandon Hoffman
*Assistant Examiner* — Helai Salehi
(74) *Attorney, Agent, or Firm* — Meunier Carlin & Curfman

(57) ABSTRACT

Methods and systems for monitoring, analyzing and acting upon voice calls in communication networks. An identification system receives monitored voice calls that are conducted in a communication network. Some of the monitored voice calls may be conducted by target individuals who are predefined as suspects. In order to maintain user privacy, the system selects and retains only voice calls that are suspected of being conducted by predefined targets. The techniques disclosed herein are particularly advantageous in scenarios where the network identifiers of the terminal used by the target are not known, or where the target uses public communication devices. In accordance with the disclosure, content-based identifiers such as speaker recognition or keyword matching are used.

16 Claims, 2 Drawing Sheets

(56) References Cited

U.S. PATENT DOCUMENTS

| | | | |
|---|---|---|---|
| 7,587,041 | B2 | 9/2009 | Blair |
| 2008/0014873 | A1 | 1/2008 | Krayer et al. |
| 2008/0261192 | A1 | 10/2008 | Huang et al. |
| 2008/0267403 | A1* | 10/2008 | Boult .......................... 380/255 |
| 2008/0285464 | A1 | 11/2008 | Katzir |
| 2010/0014676 | A1 | 1/2010 | McCarthy et al. |
| 2012/0116762 | A1 | 5/2012 | Goldfarb et al. |
| 2012/0220271 | A1 | 8/2012 | Goldfarb et al. |
| 2013/0096917 | A1* | 4/2013 | Edgar et al. .................. 704/246 |

OTHER PUBLICATIONS

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

Rohde & Schwarz GmbH & Co. KG, "ACCESSNET-T, DMX-500 R2, Digital Mobile eXchange," Product Brochure, Secure Communications, Mar. 2000, 4 pages.

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fox Replay BV, "FoxReplay Analyst," http//www.foxreplay.com, Revision 1.0, Nov. 2007, 5 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Soghoian, Christopher, et al., "Certified Lies: Detecting and Defeating Government Interception Attacks Against SSL," 2010, 19 pages.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Yu, Fang, et al., "Gigabit Rate Packet Pattern-Matching Using TCAM," Proceedings of the 12th IEEE International Conference on Network Protocols (ICNP'04), 2004, 10 pages.

* cited by examiner

SYSTEM AND METHOD FOR USER-PRIVACY-AWARE COMMUNICATION MONITORING AND ANALYSIS

FIELD OF THE DISCLOSURE

The present disclosure relates generally to communication monitoring, and particularly to methods and systems for identifying wireless communication terminals using speaker recognition.

BACKGROUND OF THE DISCLOSURE

Communication monitoring and analysis are used for various purposes, such as for tracking suspect individuals by law enforcement and security agencies. Some jurisdictions and legal frameworks impose strict regulations on communication monitoring and analysis, in order to maintain the privacy of communication users.

SUMMARY OF THE DISCLOSURE

An embodiment that is described herein provides a method including receiving monitored voice calls conducted in a communication network. A partial subset of the monitored voice calls, suspected of having been conducted by a predefined target individual, is selected. The selected partial subset is encrypted with an encryption key that is associated with the target individual, and only the encrypted partial subset of the voice calls is retained. Upon showing that the voice calls in the partial subset were conducted by the target individual with a confidence level greater than a threshold, a decryption key that is associated with the target individual is received. The encrypted partial subset of the voice calls is decrypted using the decryption key, and the decrypted voice calls are provided for analysis.

In some embodiments, selecting the partial subset includes choosing the voice calls whose speech content matches a digital voice signature of the target individual. In an embodiment, showing that the voice calls in the partial subset were conducted by the target individual includes correlating the voice calls in the partial subset with the target individual using one or more additional parameters related to the calls in addition to the voice signature. The additional parameters may include at least one parameter type selected from a group of types consisting of a location of a communication terminal conducting the calls, a language of the calls, a speaker gender, and one or more keywords found in the calls.

In a disclosed embodiment, encrypting and decrypting the voice calls include applying an asymmetric encryption scheme. In an example embodiment, the encryption key and the decryption key respectively include a public key and a private key of a public-key cryptography scheme. In another embodiment, the voice calls are conducted by communication terminals, and the method includes identifying, using the decrypted voice calls, a communication terminal operated by the target individual.

In yet another embodiment, receiving the decryption key includes receiving a warrant for accessing the encrypted voice calls. In still another embodiment, showing that the voice calls in the partial subset were conducted by the target individual includes jointly processing multiple suspected voice calls such that the confidence level exceeds the threshold.

In some embodiments, the encryption and decryption keys are managed by a first entity, and receiving and retaining the voice calls are performed by a second entity. Typically, the method includes initially receiving the encryption key but not the decryption key in the second entity from the first entity, and, only after the second entity shows that the confidence level is greater than the threshold, receiving the decryption key in the second entity from the first entity.

There is additionally provided, in accordance with an embodiment that is described herein, apparatus including an interface and a processor. The interface is configured to receive monitored voice calls conducted in a communication network. The processor is configured to select a partial subset of the monitored voice calls that are suspected of having been conducted by a predefined target individual, to encrypt the selected partial subset with an encryption key that is associated with the target individual and to retain only the encrypted partial subset of the voice calls, to receive a decryption key that is associated with the target individual upon showing that the voice calls in the partial subset were conducted by the target individual with a confidence level greater than a threshold, to decrypt the encrypted partial subset of the voice calls using the decryption key, and to provide the decrypted voice calls for analysis.

The present disclosure will be more fully understood from the following detailed description of the embodiments thereof, taken together with the drawings in which:

DETAILED DESCRIPTION OF EMBODIMENTS

Overview

Figure 1:
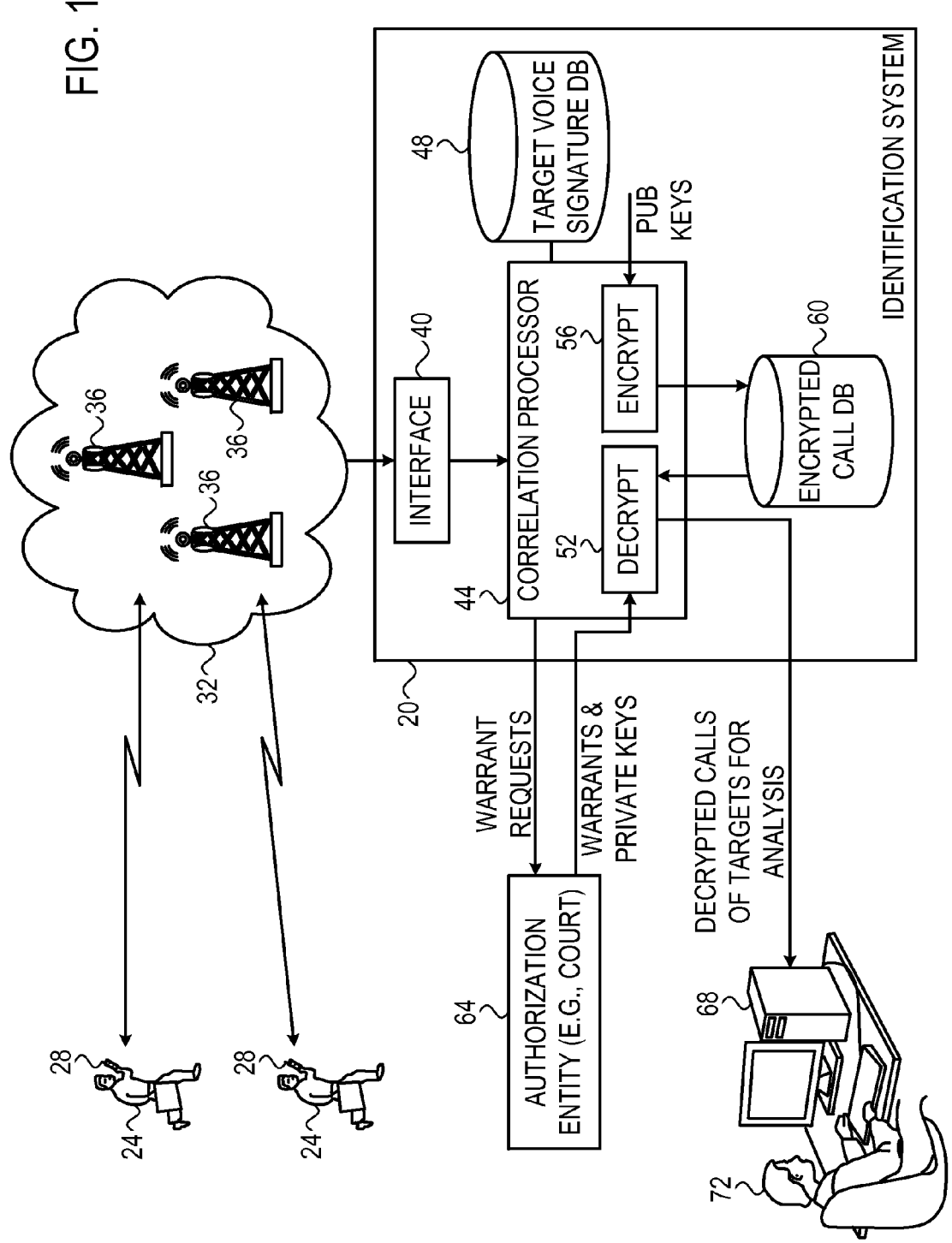
FIG. 1 is a block diagram that schematically illustrates a target identification system, in accordance with an embodiment that is described herein.

Some jurisdictions and legal frameworks impose strict regulations on call monitoring and analysis, in order to maintain user privacy. In some jurisdictions, for example, it is necessary to obtain a warrant for listening to voice calls. A warrant may be issued, for example, when it can be shown with sufficient confidence that the voice calls are conducted by a predefined target individual.

Embodiments that are described herein provide improved methods and systems for monitoring, analyzing and acting upon voice calls in communication networks. These methods and systems can be used, for example, by law enforcement and security agencies for identifying and tracking suspect individuals. The disclosed techniques enable high-performance monitoring and analysis of voice calls, while at the same time complying with privacy regulations.

In some embodiments, an identification system receives monitored voice calls that are conducted in a communication network. Some of the monitored voice calls may be conducted by target individuals who are predefined as suspects (referred to as "targets"). Most calls, however, are typically conducted by innocent users.

In order to maintain user privacy, the system selects and retains only voice calls that are suspected of being conducted by predefined targets, e.g., by using speaker recognition techniques. The disclosed techniques are in contrast to conventional techniques that identify calls of targets based only on network identifiers of the communication terminal, such as phone number, International Mobile Subscriber Identity (IMSI) or International Mobile Equipment Identity (IMEI). Thus, the techniques disclosed herein are particularly advantageous in scenarios where the network identifiers of the terminal used by the target are not known, or where the target uses public communication devices. In such scenarios, there is a need to revert to content-based identifiers such as speaker recognition or keyword matching. Additional aspects of content-based identification are addressed, for example, in U.S. patent application Ser. No. 13/284,498, 13/358,485 and Israel patent application 214,297, filed Jul. 26, 2011, which are all assigned to the assignee of the present patent application and whose disclosures are incorporated herein by reference.

Moreover, the voice calls suspected of being conducted by a certain target are encrypted with an encryption key that is uniquely associated with that target. The suspected voice calls are stored in encrypted form. The encryption scheme is asymmetric in the sense that one key is used for encrypting the calls and another key is required for decrypting them. The asymmetric encryption scheme may comprise, for example, a Rivest-Shamir-Adleman (RSA) or Diffie-Hellman scheme, or any other suitable scheme. At this stage, the system does not have access to a suitable decryption key, and therefore cannot access the content of the stored voice calls.

When the system can establish sufficient confidence that the selected voice calls are indeed conducted by the target in question, a warrant is requested. Since speaker recognition techniques are statistical in nature and may have a significant false positive ratio, the warrant is typically requested after capturing multiple calls of the same target, and increasing the confidence level by analyzing the aggregation of data that is associated with these calls. Sufficient confidence that justifies a warrant may be obtained, for example, when all calls were made from the same phone number or from the same location. The system can also use various parameters of the calls, such as gender, language or keywords, in order to increase the confidence level.

When the warrant is issued (usually by an independent entity such as a court or justice department), the warrant is provided along with a decryption key that is uniquely associated with the target. At this stage the system is able to decrypt the stored voice calls and provide them for subsequent analysis.

In a typical implementation, the above-described process is distributed between two entities (and thus two respective systems): a court, and a law enforcement agency or communication service provider. The court typically has a system that associates every target with a set of keys for encryption and decryption and issues an interception warrant based on the target voice signature and/or other criteria (e.g., location, gender, language, keywords), together with a respective encryption key.

The law enforcement agency or service provider has a system that receives the warrant, performs the interception, and once it has captured one or more calls that match the criteria defined by the court, records these calls in an encrypted manner. When the intercepted and recorded calls pass a certain confidence threshold, the system sends to the court justification information about the confidence level— e.g., how the speaker identification engine scored the probability that this call was indeed made by the target, how many calls from the same number were associated to the same target, how many other criteria were met (e.g., location, gender, language or keywords). Upon receiving this information from the law enforcement agency or service provider, the court system makes a decision (usually involving human verification) whether the confidence level is sufficiently high. If so, the court system sends the decryption keys to the law enforcement agency or service provider system.

Generally speaking, the disclosed techniques provide conditional access to decryption keys based on warrants. These techniques enable the system to operate in jurisdictions having strict privacy regulations, without compromising monitoring or analysis performance. Several example system configurations and associated methods are described herein.

System Description

FIG. 1 is a block diagram that schematically illustrates a target identification system 20, in accordance with an embodiment that is described herein. System 20 receives voice calls of wireless communication terminals 28 operated by users or individuals 24. In particular, system 20 uses methods that are described below to identify terminals that are operated by individuals who are predefined as targets. Systems of this sort may be operated, for example, by security, intelligence or law enforcement agencies in order to track suspect individuals, or by any other entity for any other purpose.

Terminals 28 communicate over a wireless communication network 32. Terminals 28 may comprise, for example, cellular phones, wireless-enabled mobile computers or Personal Digital Assistants (PDAs), or any other suitable type of communication terminals. Network 32 may comprise, for example, a cellular network such as a Global System for Mobile communication (GSM) or Universal Mobile Telecommunications System (UMTS) network, a Wireless Local-Area Network (WLAN—also referred to as Wi-Fi network), or any other suitable network type. In the present example, network 32 comprises a cellular network that comprises multiple base stations 36 with which terminals 28 communicate.

Although the embodiments described herein refer mainly to wireless communication networks, the disclosed techniques are in no way limited to such networks. In alternative embodiments, system 20 may receive and process voice calls from wire-line networks such as, for example, Voice-over-IP (VoIP) networks or from any other suitable fixed or mobile, wire-line or wireless network.

System 20 receives voice calls that are conducted by terminals 28 over network 32. In the embodiment of FIG. 1, system 20 is passive, i.e., monitors the communication using reception only without transmitting to network 32 or otherwise affecting the network operation. In alternative embodiments, however, the disclosed techniques can be applied in active monitoring systems, as well. In some embodiments, system 20 monitors the voice calls off-the-air, i.e., by receiving wireless signals that are exchanged between terminals 28 and base stations 36. Alternatively, system 20 may monitor the voice calls using other mechanisms, such as by tapping one or more of the wire-line interfaces within network 32.

In the present example, system 20 comprises an interface 40 that receives the voice calls from network 32, and a correlation processor 44 that carries out the methods described herein. System 20 further comprises a voice signature database 48 that holds digital voice signatures of target individuals, and a call database 60 that holds monitored voice calls in encrypted form. Processor 44 comprises an encryption unit 56 for encrypting the voice calls prior to storage in database 60, and a decryption unit 52 for decrypting calls that are retrieved from database 60. The functions of the various elements of system 20 are explained in detail further below.

Processor 44 typically requests warrants for accessing the encrypted voice calls stored in database 60. As explained above, in some embodiments the warrant is requested after multiple calls are processed together to yield a high confidence level. The warrants are requested from, and issued by, an authorization entity 64 such as a court or justice department. Each warrant is provided together with a decryption key that is associated with the target, and enables unit 52 to decrypt the stored voice calls of that target. The decrypted voice calls are provided to an analytics system 68 for analysis by an analyst 72.

The configuration of system 20 shown in FIG. 1 is an example configuration, which is chosen purely for the sake of conceptual clarity. In alternative embodiments, any other suitable system configuration can also be used. Some elements of system 20 may be implemented in hardware, e.g., in one or more Application-Specific Integrated Circuits (ASICs) or Field-Programmable Gate Arrays (FPGAs). Additionally or alternatively, some system elements can be implemented using software, or using a combination of hardware and software elements. Databases 48 and 60 may be implemented using any suitable type of memory, such as using one or more magnetic or solid state memory devices.

Typically, processor 44 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

User-Privacy-Aware Voice Call Monitoring and Analysis

As explained above, system 20 operates under a legal or regulatory framework that restricts access to monitored calls, in order to maintain the privacy of users 24 of network 32. Typically, access to the monitored calls is governed by warrants: Independent authorization entity 64 issues warrants that permit the monitoring agency to access the call content. A warrant is issued, for example, if it can be shown with sufficient confidence that a group of calls are indeed conducted by a predefined target individual and not by some innocent user.

System 20 applies several features for complying with such regulations. In some embodiments, correlation processor 44 filters the monitored calls received via interface 40, and retains only the calls that are suspected of being conducted by the predefined targets. Other voice calls are typically discarded.

In the present example, processor 44 filters the voice calls using speaker recognition techniques. In these embodiments, processor 44 compares the speech content of the monitored calls to the digital voice signatures stored in database 48. If the speech content of a certain call matches the voice signature of a predefined target, the call is suspected as being conducted by that target and therefore retained. Otherwise, the call is discarded from the system.

The term "voice signature" refers to any information that is uniquely indicative of the voice characteristics of a certain target individual, such that comparing digitized speech to the voice signature enables deciding with high likelihood whether the digitized speech was enunciated by the target individual. Voice signatures are sometimes referred to as voiceprints. The voice signatures in database 48 may be produced or provided to system 20 in any suitable way.

Processor 44 may use any suitable speaker recognition technique for matching the speech content of the monitored calls to the voice signatures in database 48. For example, Reynolds and Rose describe text-independent speaker identification techniques, in "Robust Text-Independent Speaker Identification using Gaussian Mixture Speaker Models," IEEE Transactions on Speech and Audio Processing, volume 3, no. 1, January, 1995, which is incorporated herein by reference. Another technique is described by Monte et al., in "Text-Independent Speaker Identification on Noisy Environments by Means of Self Organizing Maps," Proceedings of the Fourth International Conference on Spoken Language (ICSLP), October, 1996, which is incorporated herein by reference.

In addition to matching speech to voice signatures, in some embodiments correlation processor 44 correlates voice calls with targets based on additional parameters related to the calls. Such parameters may comprise, for example, the location of the communication terminal, the language of the call, the speaker gender, keywords found in the call, and/or any other suitable parameter. In these embodiments, correlation processor typically assigns scores to the calls using these parameters, and stores the parameters with the respective calls as justification data for convincing the court when requesting a warrant.

Following the speaker-recognition-based selection, processor 44 sends the selected voice calls for storage in call database 60. Before storage, encryption unit 56 encrypts the selected voice calls, such that the calls are stored in database 60 in encrypted form. Typically, system 20 holds a respective unique encryption key for each predefined target, and unit 56 encrypts each call with an encryption key that is uniquely associated with the target individual suspected of conducting the call.

Note that the encryption key enables encryption but not decryption. For example, the encryption key may comprise a public key of a public-key cryptography scheme. Therefore, system 20 is unable to decrypt and access the calls stored in database 60 until a suitable decryption key (e.g., a private key in the case of public-key cryptography) is provided. As such, user privacy is strictly maintained.

At some stage after storing the selected calls of a certain target, processor 44 requests a warrant for accessing the content of the calls. Typically, in order to obtain a warrant, system 20 is required to establish a sufficient confidence level that the calls are indeed conducted by the target in question. For example, authorization entity 64 may specify a confidence threshold, e.g., a certain minimal detection probability and/or maximal false-alarm probability, which should be met by system 20 in order to qualify for a warrant. As noted above, system 20 may establish the confidence level using additional parameters such as location, language, speaker gender or identified keywords.

In some embodiments, the performance (e.g., detection probability and/or false-alarm probability) of the signature-based speaker recognition techniques used by processor 44 is sufficient for obtaining a warrant. In some embodiments, system 20 collects additional voice calls of the target until the speaker recognition confidence level reaches the threshold. In an example embodiment, the false recognition probability (i.e., the probability that an innocent call will be erroneously identified as associated with a target) is on the order of between 0.0001% and 0.0005%.

When authorization entity 64 issues a warrant to access the voice calls of a certain target, it also provides system 20 with a decryption key (e.g., private key) that is uniquely associated with this target. The decryption key enables decryption unit 52 to decrypt the voice calls stored in database 60. After decryption, system 20 sends the decrypted voice calls to analytics system 68 for analysis.

Figure 2:
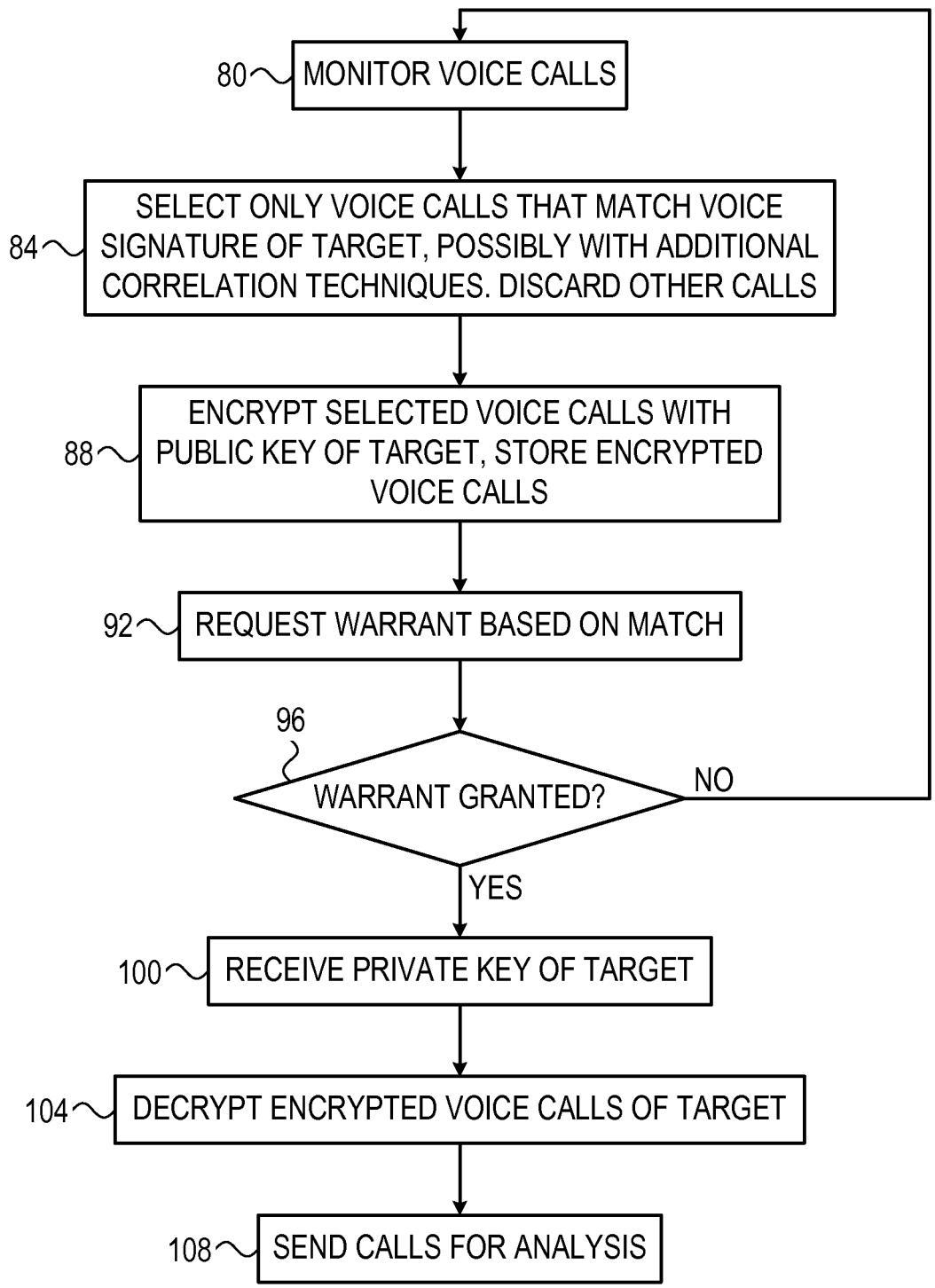
FIG. 2 is a flow chart that schematically illustrates a method for monitoring voice calls while maintaining user privacy, in accordance with an embodiment that is described herein.

FIG. 2 is a flow chart that schematically illustrates a method for monitoring voice calls while maintaining user privacy, in accordance with an embodiment that is described herein. The method begins with system 20 receiving monitored voice calls, at an input step 80.

In some embodiments, processor 44 (or some external system) applies initial filtering to the monitored calls in order to reduce the computational load on system 20. Such filtering may retain, for example, calls from certain cell IDs, calls having certain terminal identifiers (e.g., IMSI or IMEI prefixes), calls from terminals that roam from a particular country, calls from a particular prefix and/or to a particular prefix, and/or retain calls using any other suitable criterion.

Processor 44 uses speaker recognition techniques to select only the voice calls that are suspected of being conducted by targets, at a selection step 84. In some embodiments, processor 44 applies additional speech analysis techniques to increase the selection performance. Such auxiliary techniques may comprise, for example, gender identification, language identification, accent identification, filtering schemes based on the use of known keywords and taxonomy, or any other suitable technique. Processor 44 retains only the voice calls that are suspected of being conducted by targets, and discards the other calls.

After selecting the voice calls to be retained, encryption unit 56 encrypts the voice calls and sends the encrypted calls for storage in database 60, at an encryption & storage step 88. Unit 56 encrypts each voice call with an encryption key (e.g., public key) that is uniquely associated with the corresponding target. The encrypted calls stored in database 60 may comprise the call content (e.g., speech content), and possibly signaling, call metadata, Call Detail Record (CDR) and/or any other suitable information related to the calls.

Processor 44 requests the authorization entity for a warrant to access the calls of a certain target, at a warrant requesting step 92. The warrant request is typically based on the results of the speaker-recognition matching, and typically indicates the confidence level of the match.

Processor 44 checks whether a warrant is granted, at a warrant checking step 96. If a warrant is not granted, the method loops back to step 80 above. If a warrant is issued, processor 44 receives a decryption key (e.g., private key) that is uniquely associated with the target, at a key reception step 100. Decryption unit 52 decrypts the voice calls of the target in database 60 using the decryption key, at a decryption step 104. Processor 44 then sends the decrypted calls to analytics system 68 for subsequent analysis, at an output step 108. The voice calls provided to system 68 may comprise the call content, signaling and/or metadata.

Analytics system 68 (or processor 44 in some embodiments) may take various actions with respect to the voice calls provided by identification system 20. In an example embodiment, the call metadata comprises one or more identifiers (e.g., IMSI or IMEI) of the terminal 28 from which the voice call was made. System 68 (or processor 44) may correlate the terminal identifier with the target, and from that point track the terminal using the correlated identifier. This technique is highly effective in tracking targets that use prepaid phones or new phones in order to evade surveillance.

The disclosed technique can also be useful, for example, for information sharing between agencies, for identifying the opposite side of a voice call (other than the predefined target), or for any other suitable application. Additional aspects of speaker recognition techniques, correlation of targets with terminal identifiers and related techniques can be found in Israel patent application 214,297, filed Jul. 26, 2011, cited above.

In some embodiments, authorization entity 64 holds additional recorded speech that is known to belong to a given target. When issuing a warrant for this target, entity 64 provides system 20 with the additional speech content. Processor 44 may use the additional speech content to further improve the voice signature of the target in question.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    receiving monitored voice calls conducted in a communication network;
    selecting a partial subset of the monitored voice calls that are suspected of having been conducted by a predefined target individual, encrypting the selected partial subset with an encryption key that is associated with the target individual, and retaining only the encrypted partial subset of the voice calls, wherein selecting the partial subset comprises choosing calls whose speech content matches a digital voice signature of the target individual;
    upon showing that the voice calls in the partial subset were conducted by the target individual with a confidence level greater than a threshold, receiving a decryption key that is associated with the target individual, wherein showing that the voice calls in the partial subset were conducted by the target individual comprises jointly processing multiple suspected voice calls such that the confidence level exceeds the threshold; and
    decrypting the encrypted partial subset of the voice calls using the decryption key, and providing the decrypted voice calls for analysis.

2. The method according to claim 1, wherein showing that the voice calls in the partial subset were conducted by the target individual comprises correlating the voice calls in the partial subset with the target individual using one or more additional parameters related to the calls in addition to the voice signature.

3. The method according to claim 1, wherein encrypting and decrypting the voice calls comprise applying an asymmetric encryption scheme.

4. The method according to claim 1, wherein the voice calls are conducted by communication terminals, and comprising identifying, using the decrypted voice calls, a communication terminal operated by the target individual.

5. The method according to claim 1, wherein receiving the decryption key comprises receiving a warrant for accessing the encrypted voice calls.

6. The method according to claim 1, wherein the encryption and decryption keys are managed by a first entity, and wherein receiving and retaining the voice calls are performed by a second entity.

7. The method according to claim 2, wherein the additional parameters comprise at least one parameter type selected from a group of types consisting of a location of a communication terminal conducting the calls, a language of the calls, a speaker gender, and one or more keywords found in the calls.

8. The method according to claim 3, wherein the encryption key and the decryption key respectively comprise a public key and a private key of a public-key cryptography scheme.

9. The method according to claim 6, and comprising initially receiving the encryption key but not the decryption key in the second entity from the first entity, and, only after the second entity shows that the confidence level is greater than the threshold, receiving the decryption key in the second entity from the first entity.

10. Apparatus, comprising:
an interface, which is configured monitored to receive monitored voice calls
conducted in a communication network; and
a processor, which is configured to select a partial subset of the monitored voice calls that are suspected of having been conducted by a predefined target individual, to encrypt the selected partial subset with an encryption key that is associated with the target individual and to retain only the encrypted partial subset of the voice calls, to receive a decryption key that is associated with the target individual upon showing that the voice calls in the partial subset were conducted by the target individual with a confidence level greater than a threshold, to decrypt the encrypted partial subset of the voice calls using the decryption key, and to provide the decrypted voice calls for analysis,
wherein the processor is further configured to select the partial subset by choosing the voice calls whose speech content matched a digital voice signature of the target individual and further configured to jointly process multiple suspected voice calls such that the confidence level exceeds the threshold to.

11. The apparatus according to claim 10, wherein the processor is configured to correlate the voice calls in the partial subset with the target individual using one or more additional parameters related to the calls in addition to the voice signature.

12. The apparatus according to claim 10, wherein the processor is configured to encrypt and decrypt the voice calls by applying an asymmetric encryption scheme.

13. The apparatus according to claim 10, wherein the voice calls are conducted by communication terminals, and wherein the processor is configured identify, using the decrypted voice calls, a communication terminal operated by the target individual.

14. The apparatus according to claim 10, wherein, upon receiving the decryption key, the processor is configured to receive a warrant for accessing the encrypted voice calls.

15. The apparatus according to claim 11, wherein the additional parameters comprise at least one parameter type selected from a group of types consisting of a location of a communication terminal conducting the calls, a language of the calls, a speaker gender, and one or more keywords found in the calls.

16. The apparatus according to claim 12, wherein the encryption key and the decryption key respectively comprise a public key and a private key of a public-key cryptography scheme.

* * * * *